(12) United States Patent
Taniguchi et al.

(10) Patent No.: US 12,103,612 B2
(45) Date of Patent: Oct. 1, 2024

(54) ROLLER UNIT OF CRAWLER TRAVEL UNIT, CRAWLER TRAVEL UNIT, AND WORK MACHINE

(71) Applicant: KOMATSU LTD., Tokyo (JP)

(72) Inventors: Masahiko Taniguchi, Tokyo (JP); Noriyuki Kitai, Tokyo (JP); Kazuo Maeda, Tokyo (JP)

(73) Assignee: KOMATSU LTD., Tokyo (JP)

( * ) Notice: Subject to any disclaimer, the term of this patent is extended or adjusted under 35 U.S.C. 154(b) by 658 days.

(21) Appl. No.: 17/418,996

(22) PCT Filed: Apr. 8, 2020

(86) PCT No.: PCT/JP2020/015817
§ 371 (c)(1),
(2) Date: Jun. 28, 2021

(87) PCT Pub. No.: WO2020/217993
PCT Pub. Date: Oct. 29, 2020

(65) Prior Publication Data
US 2022/0097784 A1 Mar. 31, 2022

(30) Foreign Application Priority Data
Apr. 25, 2019 (JP) .................................. 2019-084399

(51) Int. Cl.
*B62D 55/15* (2006.01)
*B62D 55/088* (2006.01)
*B62D 55/06* (2006.01)

(52) U.S. Cl.
CPC ........... *B62D 55/15* (2013.01); *B62D 55/088* (2013.01); *B62D 55/06* (2013.01)

(58) Field of Classification Search
CPC ....... B62D 55/15; B62D 55/14; B62D 55/088
See application file for complete search history.

(56) References Cited

U.S. PATENT DOCUMENTS 2,614,006 A * 10/1952 Bechman ............... B62D 55/15
  384/381
3,586,398 A * 6/1971 Dadds, ................... B62D 55/15
  384/418

(Continued)

FOREIGN PATENT DOCUMENTS

CN    102481959 A    5/2012
CN    203020436 U    6/2013

(Continued)

OTHER PUBLICATIONS

JP Office Action dated Nov. 22, 2022 from corresponding Japanese patent application No. 2019- 084399 (with attached English-language translation).

(Continued)

*Primary Examiner* — Jason R Bellinger
(74) *Attorney, Agent, or Firm* — Faegre Drinker Biddle & Reath LLP

(57) ABSTRACT

A shaft has an outer circumferential surface provided with a recessed portion in which a cooling medium is accommodated. A roller is rotatable relative to the outer circumferential surface of the shaft. A radial sliding bearing supports the roller to be rotatable relative to the outer circumferential surface of the shaft. A floating seal includes a rotating-side member that is supported by the roller and a fixed-side member that slides together with the rotating-side member. In a radial direction of the shaft, the recessed portion faces: a sliding portion between the rotating-side member and the fixed-side member in the floating seal: and the radial sliding bearing.

6 Claims, 13 Drawing Sheets

(56) References Cited

U.S. PATENT DOCUMENTS

| | | | | |
|---|---|---|---|---|
| 3,679,216 | A * | 7/1972 | Dadds | B62D 55/15 |
| | | | | 277/382 |
| 4,427,311 | A * | 1/1984 | Takenaka | F16C 33/74 |
| | | | | 384/418 |
| 5,527,046 | A * | 6/1996 | Bedford | F16J 15/344 |
| | | | | 277/381 |
| 6,874,859 | B1 * | 4/2005 | Duse | B62D 55/15 |
| | | | | 305/136 |
| 7,374,257 | B2 * | 5/2008 | Oertley | F16C 23/041 |
| | | | | 305/136 |
| 9,868,482 | B2 * | 1/2018 | Rust | G01N 3/56 |
| 2002/0153773 | A1 * | 10/2002 | Yoon | B62D 55/15 |
| | | | | 305/136 |
| 2005/0040705 | A1 | 2/2005 | Yamamoto et al. | |
| 2012/0146397 | A1 | 1/2012 | Hisamatsu | |
| 2017/0050688 | A1 | 2/2017 | Oertley et al. | |
| 2017/0088204 | A1 | 3/2017 | Brooks et al. | |

FOREIGN PATENT DOCUMENTS

| | | |
|---|---|---|
| CN | 203946186 U | 11/2014 |
| CN | 205499101 U | 8/2016 |
| CN | 107922023 A | 4/2018 |
| DE | 60010340 T2 | 5/2005 |
| GB | 1447156 A | 8/1976 |
| JP | S49-124736 U | 10/1974 |
| JP | S50-23942 Y1 | 7/1975 |
| JP | S50-088735 A | 7/1975 |
| JP | S50-88736 A | 7/1975 |
| JP | S53-56641 U | 5/1978 |
| JP | H01-173089 U | 12/1989 |
| JP | H04-067584 U | 6/1992 |
| JP | H08-230731 A | 9/1996 |
| JP | 2003-525169 A | 8/2003 |
| JP | 2004-082819 A | 3/2004 |
| JP | 2004-276696 A | 10/2004 |
| JP | 3701912 B2 | 10/2005 |
| KR | 2003-0083167 A | 10/2003 |
| WO | WO 01/64503 A1 | 9/2001 |

OTHER PUBLICATIONS

English translation of Written Opinion of the International Searching Authority mailed Jun. 16, 2020 for PCT/JP2020/015817.
Norm Din Iso 12128 1998-07-00. Gleitlager-Schmierlöcher, Schmiernuten und Schmiertaschen—Maße, Formen, Bezeichnung und ihre Anwendung für Lagerbuchsen.
Schmid, E., Weber, R.: Gleitlager. Berlin [et al.]: Springer, 1. edition 1953. ISBN: 978-3-642-86874-0.
English Language Translation of Office Action dated May 5, 2023 from corresponding German patent application No. 11 2020 000 228.4.

* cited by examiner

ROLLER UNIT OF CRAWLER TRAVEL UNIT, CRAWLER TRAVEL UNIT, AND WORK MACHINE The present application is a National Stage of International Application No. PCT/JP2020/015817, filed Apr. 8, 2020, which claims priority to Japanese Patent Application 2019-084399, filed Apr. 25, 2019. The entire contents of these applications are incorporated herein by reference in their entirety.

TECHNICAL FIELD

The present disclosure relates to a roller unit of a crawler travel unit, the crawler travel unit, and a work machine.

BACKGROUND ART

A floating seal incorporated in a track roller of a work machine allows a seal ring disposed on the rotation side to slide relative to a seal ring disposed on the fixed side, thereby sealing an end of a path through which lubricating oil is supplied.

Work machines such as a bulldozer have recently been demanded to be improved in work efficiency by higher speed traveling. As the rotation speeds of rollers have increased, the amount of heat generated around the floating seal has increased.

For dealing with such a situation, for example, Japanese Patent Laying-Open No. 2004-82819 (see PTL 1) discloses a technique for suppressing generation of frictional heat in a roller unit by providing a bearing with a mechanism for regulating a sliding motion relative to a shaft.

CITATION LIST

Patent Literature

PTL 1: Japanese Patent Laying-Open No. 2004-82819

SUMMARY OF INVENTION

Technical Problem

The mechanism for regulating a sliding motion disclosed in the above-mentioned PTL 1 has a complicated structure.

The present disclosure aims to provide a roller unit of a crawler travel unit, the crawler travel unit, and a work machine that are capable of suppressing heat generation by improving cooling performance in a simple structure.

Solution to Problem

A roller unit of a crawler travel unit of the present disclosure includes a shaft, a roller, a first sliding bearing, and a floating seal. The shaft has an outer circumferential surface provided with a recessed portion in which a cooling medium is accommodated. The roller is rotatable relative to the outer circumferential surface of the shaft. The first sliding bearing supports the roller to be rotatable relative to the outer circumferential surface of the shaft, and receives force in a radial direction of the shaft. The floating seal includes a rotating-side member that is supported by the roller and a fixed-side member that slides together with the rotating-side member. In the radial direction of the shaft, the recessed portion faces: a sliding portion between the rotating-side member and the fixed-side member in the floating seal; and the first sliding bearing.

Advantageous Effects of Invention

The present disclosure can implement a roller unit of a crawler travel unit, the crawler travel unit, and a work machine that are capable of suppressing heat generation by improving cooling performance in a simple structure.

DESCRIPTION OF EMBODIMENTS

Figure 1:
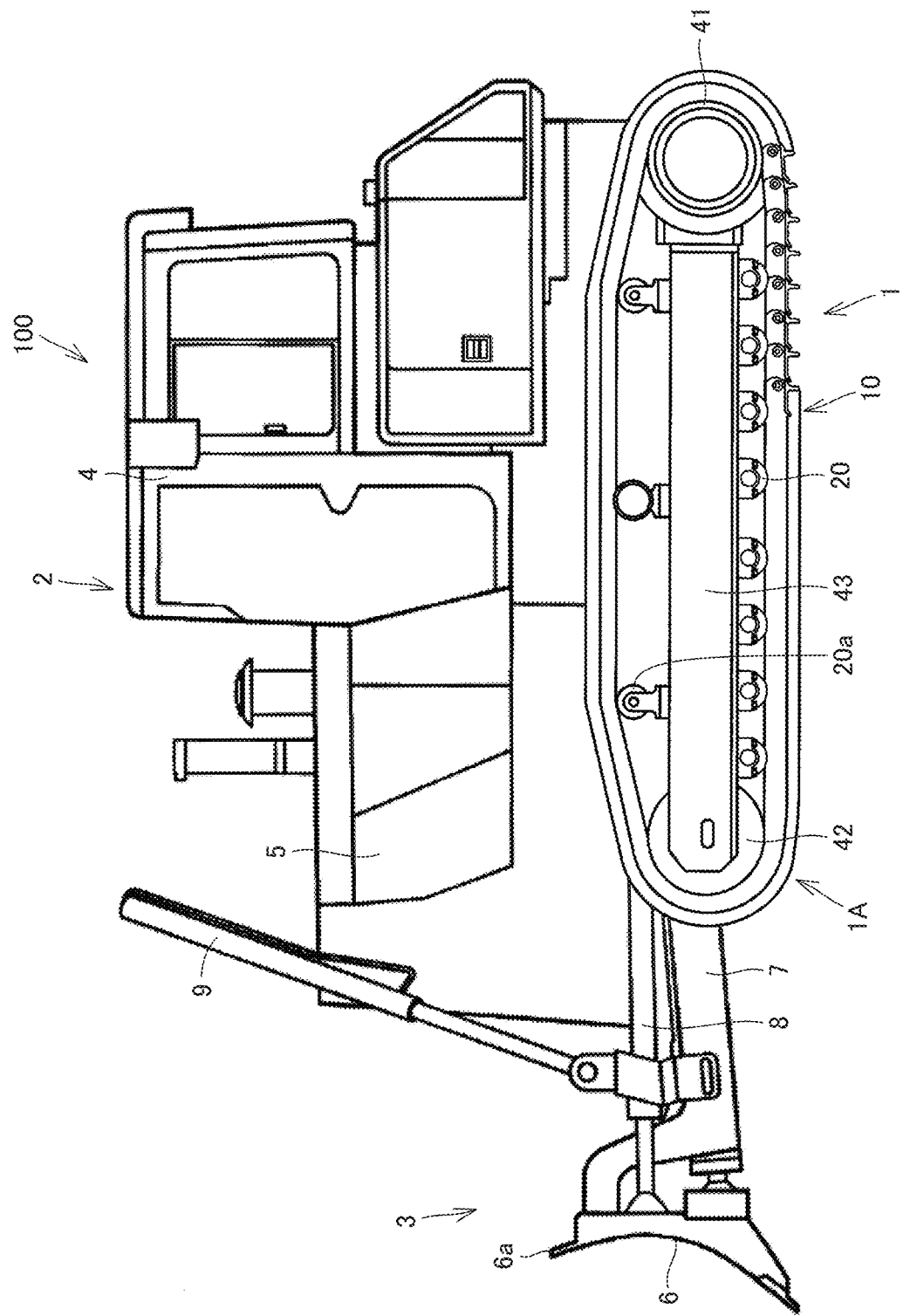
FIG. 1 is a schematic side view showing a configuration of a bulldozer as an example of a work machine according to a first embodiment of the present disclosure.

Hereinafter, embodiments of the present disclosure will be described in detail with reference to the accompanying drawings. In the specification and the accompanying drawings, the same or corresponding components are denoted by the same reference characters, and the description thereof will not be repeated. In the accompanying drawings, some configurations may be omitted or simplified for convenience of description. At least some of the embodiments and the modifications may be optionally combined with each other.

First Embodiment

<Construction of Work Machine>

First, a configuration of a bulldozer as an example of a work machine according to the first embodiment of the present disclosure will be described with reference to FIG.

1. It should be noted that the present disclosure is not limited to a bulldozer, but may be applicable to any work machine including a crawler travel unit such as a hydraulic excavator.

FIG. 1 is a schematic side view showing a configuration of a bulldozer as an example of a work machine according to the first embodiment of the present disclosure. As shown in FIG. 1, a bulldozer as a work machine 100 according to the present embodiment mainly includes a crawler travel unit 1, a vehicular body 2, and a work implement 3. Vehicular body 2 and work implement 3 constitute a work machine body.

Vehicular body 2 includes a cab (an operator's cab) 4 and an engine compartment 5. Cab 4 is disposed in an upper rear portion of vehicular body 2, and engine compartment 5 is disposed in front of cab 4.

Work implement 3 includes a blade 6, a frame 7, an angle cylinder 8, and a lift cylinder 9. Blade 6 is disposed in front of vehicular body 2. Blade 6 is supported on the right and left sides by frame 7. One end of frame 7 is attached to a rear surface of blade 6 by a rotatable support portion. The other end of frame 7 is rotatably supported on the side surface of vehicular body 2.

Blade 6 is driven by angle cylinder 8 and lift cylinder 9. One end of angle cylinder 8 is rotatably supported on the rear surface of blade 6. The other end of angle cylinder 8 is rotatably supported on the side surface of vehicular body 2.

Due to expansion and contraction of angle cylinder 8 by hydraulic pressure, blade 6 pivots around a support portion by frame 7. Thereby, an upper end 6a of blade 6 moves in the front-rear direction (in the right-left direction in FIG. 1), to thereby perform angling control of blade 6 in the front-rear direction.

One end of lift cylinder 9 is rotatably supported on an upper surface of frame 7. An intermediate portion of lift cylinder 9 is rotatably supported on a side surface of vehicular body 2. Lift cylinder 9 expands and contracts by hydraulic pressure to cause blade 6 to move about the other end of frame 7 in the up-down direction.

Crawler travel unit 1 includes a pair of right and left crawler belt units 1A. The pair of right and left crawler belt units 1A are spaced apart from each other in the vehicle width direction of a bulldozer 100. The pair of right and left crawler belt units 1A are disposed so as to sandwich vehicular body 2 therebetween.

The pair of right and left crawler belt units 1A each mainly include a crawler belt 10, a track roller 20, a carrier roller 20a, a drive wheel (sprocket) 41, an idler wheel (idler) 42, and a track frame 43.

Each of drive wheel 41 and track frame 43 is attached to a side portion of vehicular body 2. Each of idler wheel 42, a plurality of track rollers 20, and a plurality of carrier rollers 20a is attached to track frame 43.

Drive wheel 41 is disposed behind track frame 43 such that it can be driven to rotate. Idler wheel 42 is rotatably disposed, for example, at a front end portion of track frame 43. The plurality of track rollers 20 are rotatably disposed on the lower side of track frame 43. The plurality of carrier rollers 20a are rotatably disposed on the upper surface side of track frame 43.

Crawler belt 10 is configured in an annular shape (an endless manner) and looped over drive wheel 41 and idler wheel 42. Further, crawler belt 10 is rotatably supported by the plurality of track rollers 20 and the plurality of carrier rollers 20a, which are disposed between drive wheel 41 and idler wheel 42.

Crawler belt 10 is engaged with drive wheel 41 and is configured to be rotatable as drive wheel 41 is driven to rotate. When crawler belt 10 rotates, each of idler wheel 42, the plurality of track rollers 20 and the plurality of carrier rollers 20a comes into contact with crawler belt 10, and thus, can be driven to rotate.

The work machine body formed of vehicular body 2 and work implement 3 is supported by crawler travel unit 1 such that it can travel.

<Configuration of Track Roller 20>

In the following, a configuration of track roller 20 used in work machine 100 according to the present embodiment will be described with reference to FIGS. 2 to 5.

Figure 2:
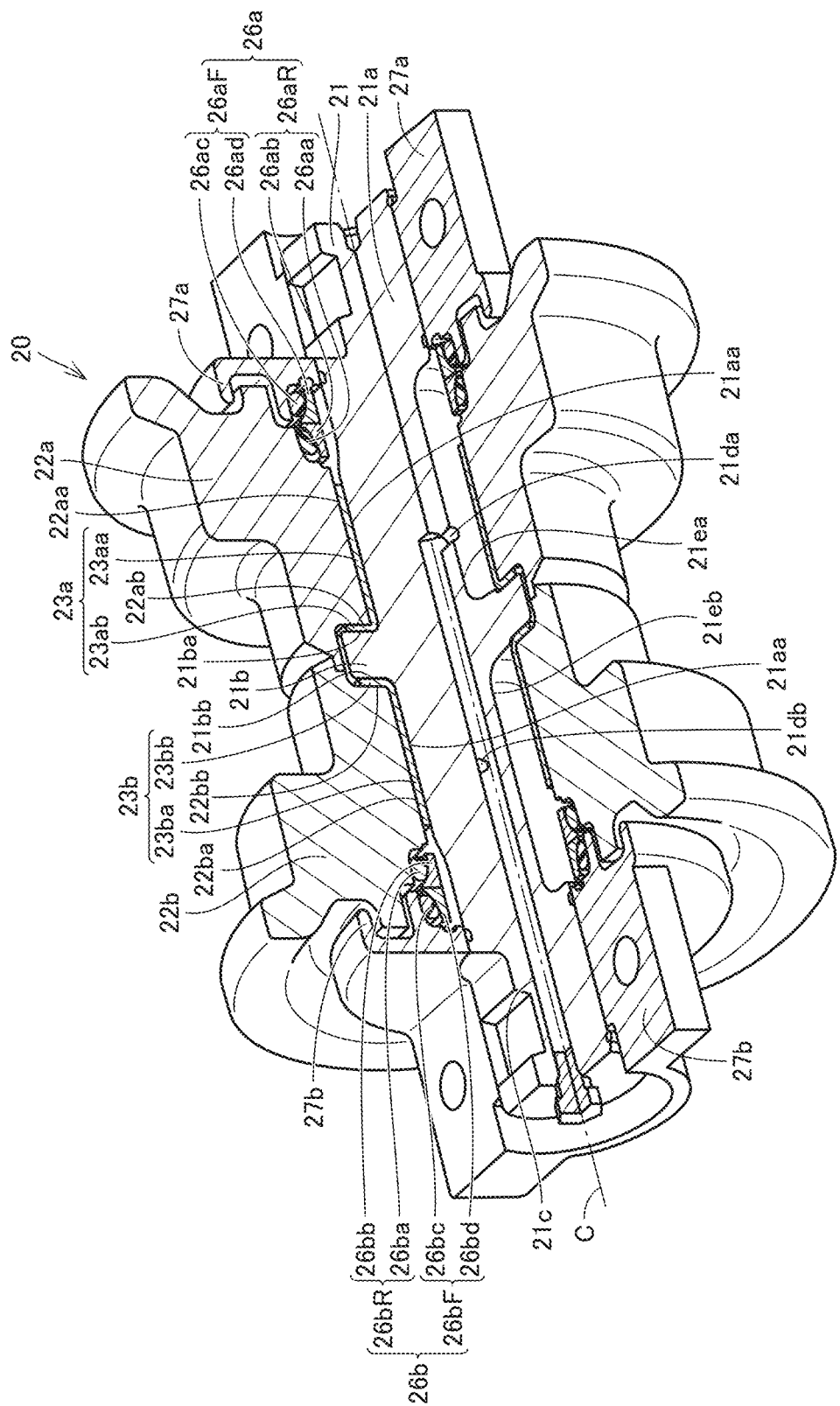
FIG. 2 is a partially cutaway perspective view showing a configuration of a track roller included in the work machine in FIG. 1.
Figure 3:
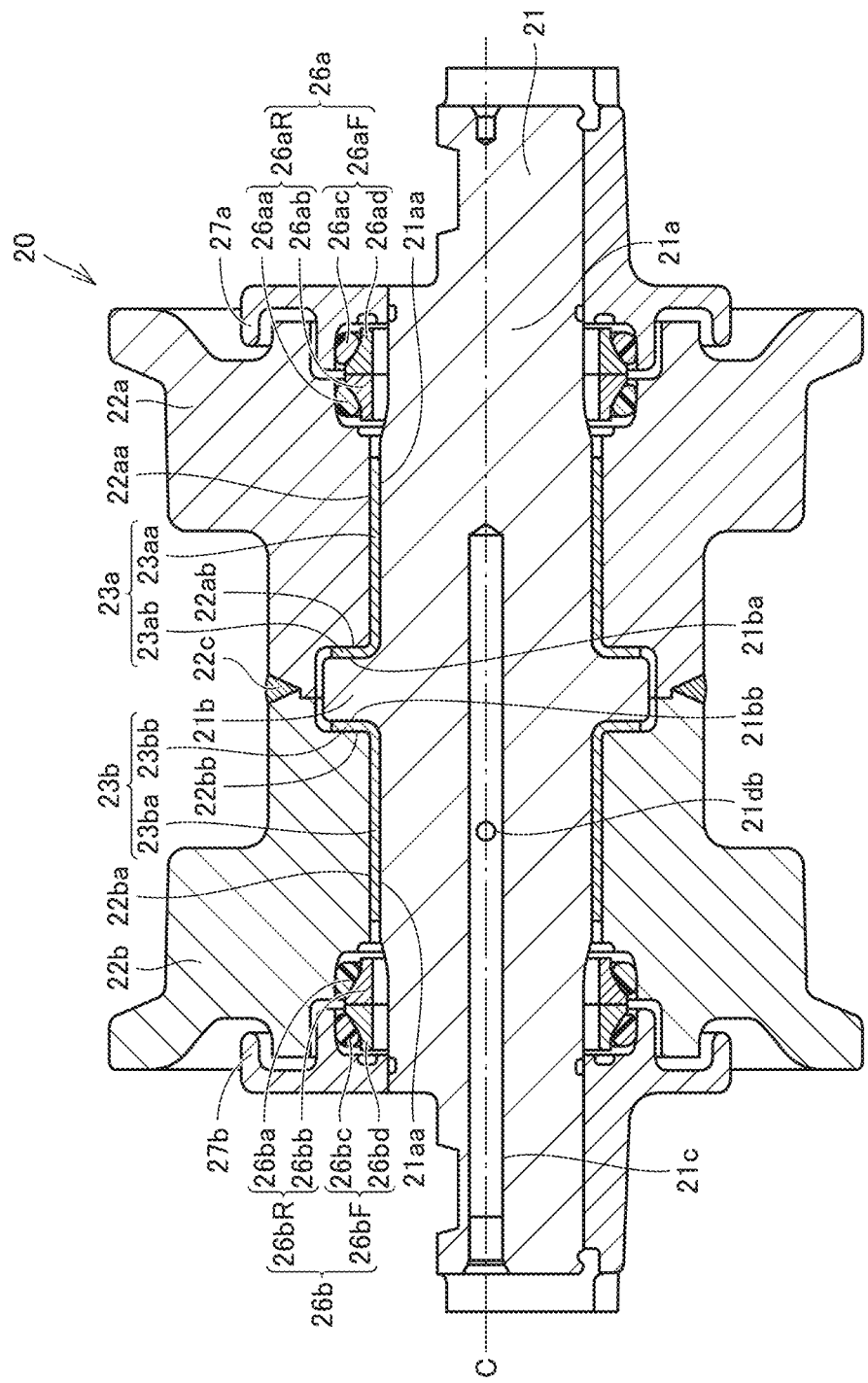
FIG. 3 is a first cross-sectional view showing the configuration of the track roller shown in FIG. 2.
Figure 4:
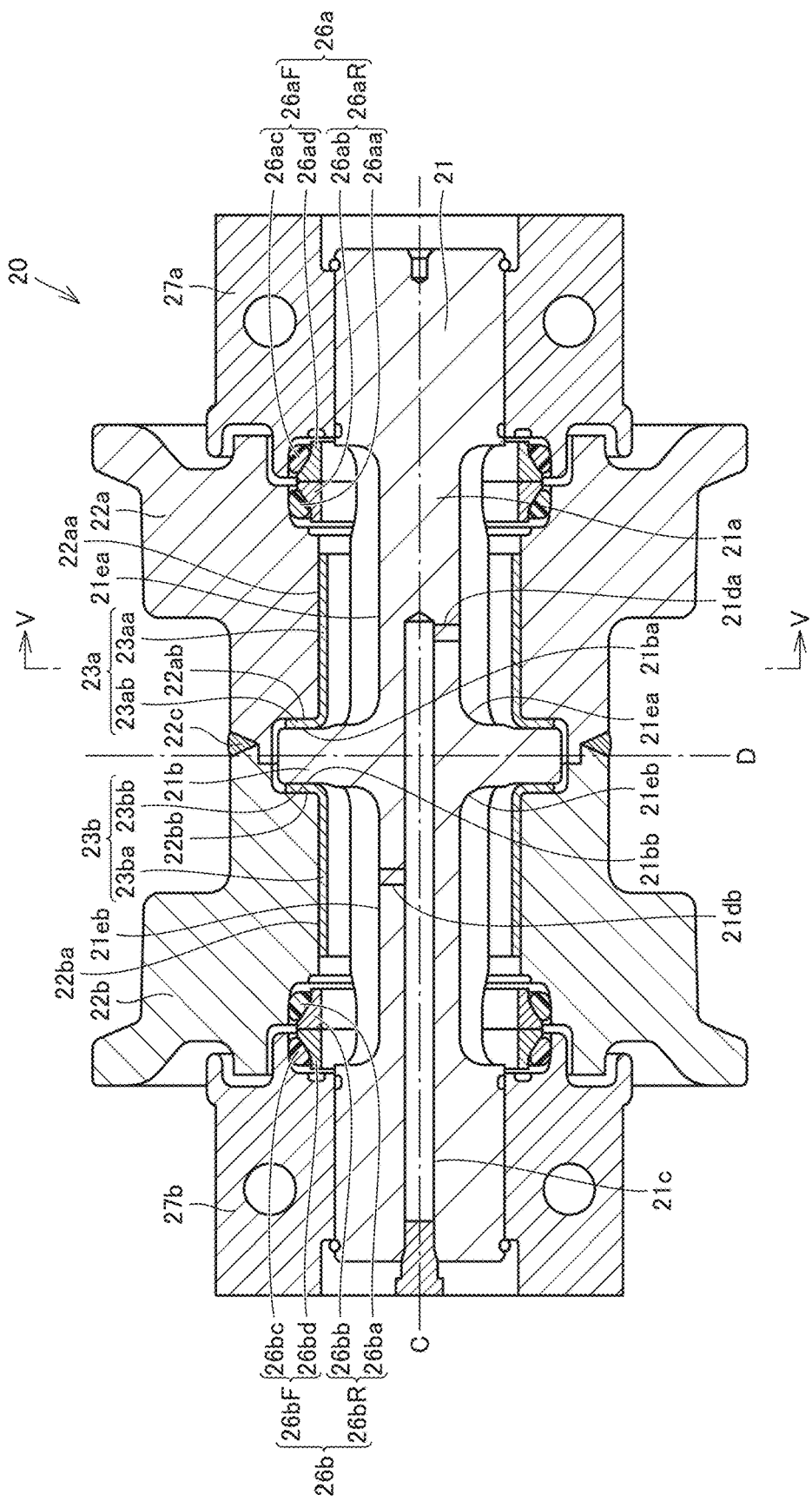
FIG. 4 is a second cross-sectional view showing the configuration of the track roller shown in FIG. 2.
Figure 5:
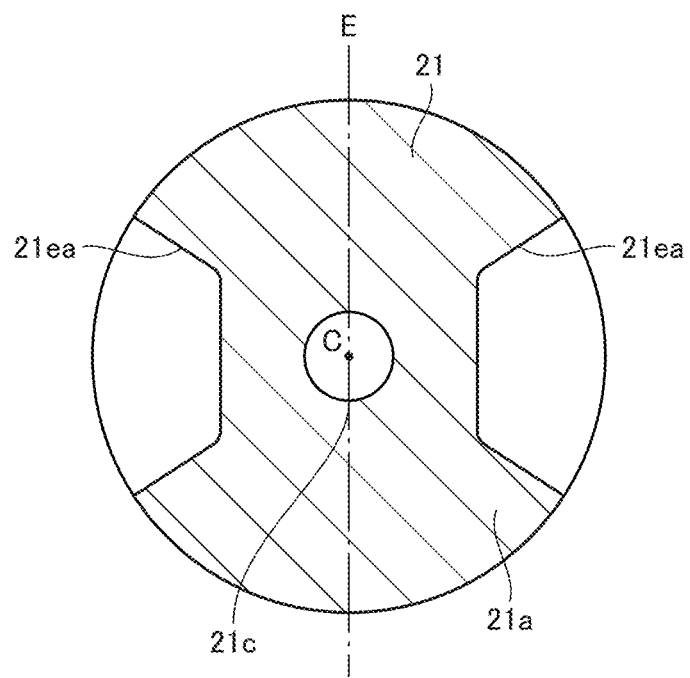
FIG. 5 is a cross-sectional view of a shaft taken along a line V-V in FIG. 4.

FIG. 2 is a partially cutaway perspective view showing a configuration of the track roller included in the work machine in FIG. 1. FIGS. 3 and 4 are a first cross-sectional view and a second cross-sectional view, respectively, each of which shows the configuration of the track roller shown in FIG. 2. FIG. 5 is a cross-sectional view of a shaft taken along a line V-V in FIG. 4.

The cross sections in FIGS. 3 and 4 are taken along an axis line C of shaft 21 and cut at angles different from each other by 90 degrees. Further, the cross section in FIG. 5 is taken along the direction orthogonal to axis line C.

As shown in FIG. 2, track roller 20 in the present embodiment includes shaft 21, rollers 22a and 22b, sliding bearing members 23a and 23b, floating seals 26a and 26b, and supports 27a and 27b.

Shaft 21 is externally surrounded by two rollers 22a and 22b. Sliding bearing member 23a is disposed between shaft 21 and roller 22a. Support 27a is fixed to one end side of shaft 21. A rotating-side member 26aR of floating seal 26a is supported by roller 22a. A fixed-side member 26aF of floating seal 26a is supported by shaft 21 with support 27a interposed therebetween.

Sliding bearing member 23b is disposed between shaft 21 and roller 22b. Support 27b is fixed to the other end side of shaft 21. A rotating-side member 26bR of floating seal 26b is supported by roller 22b. A fixed-side member 26bF of floating seal 26b is supported by shaft 21 with support 27b interposed therebetween.

As shown in FIG. 3, shaft 21 includes a shaft body 21a and an intermediate flange 21b. Shaft body 21a has an axis line C (an imaginary line) that passes through the axis center of shaft body 21a.

Intermediate flange 21b protrudes radially outward of shaft body 21a with respect to an outer circumferential surface 21aa of shaft body 21a. Intermediate flange 21b has an annular shape and protrudes from outer circumferential surface 21aa of shaft body 21a along the entire circumference in the circumferential direction. Intermediate flange 21b is formed integrally with shaft body 21a. Intermediate flange 21b is disposed near the center of shaft body 21a in the axial direction of shaft body 21a (in the direction in which axis line C extends).

Intermediate flange 21b has end faces 21ba and 21bb facing each other in the axial direction of shaft body 21a. Each of these two end faces 21ba and 21bb of intermediate flange 21b is orthogonal to outer circumferential surface 21aa of shaft body 21a, for example. Two end faces 21ba and 21bb of intermediate flange 21b are parallel to each other, for example.

Each of rollers 22a and 22b has a cylindrical shape. Each of rollers 22a and 22b has a through hole passing therethrough from one end side to the other end side. Shaft 21 is inserted into the through hole of each of rollers 22a and 22b. Each of rollers 22a and 22b externally surrounds shaft 21.

One end of roller 22a and one end of roller 22b abut on each other to come into contact with each other. One end of roller 22*a* and one end of roller 22*b* are fixed to each other by a weld 22*c*. Weld 22*c* is provided along the entire circumference in the circumferential direction.

The portion where rollers 22*a* and 22*b* abut on each other is located on the radially outside of shaft 21 with respect to intermediate flange 21*b*. Weld 22*c* is also located on the radially outside of shaft 21 with respect to intermediate flange 21*b*.

Roller 22*a* has an end face 22*ab* at a position of a recess that is recessed from one end of roller 22*a* toward the other end of roller 22*a*. Roller 22*b* has an end face 22*bb* at a position of a recess that is recessed from one end of roller 22*b* toward the other end of roller 22*b*.

Sliding bearing member 23*a* has a flanged cylindrical shape. Sliding bearing member 23*a* is press-fitted onto an inner circumferential surface 22*aa* of roller 22*a*. Thus, sliding bearing member 23*a* is rotatable together with roller 22*a*. Sliding bearing member 23*a* is located between inner circumferential surface 22*aa* of roller 22*a* and outer circumferential surface 21*aa* of shaft 21. Sliding bearing member 23*a* is located also between end face 21*ba* of intermediate flange 21*b* and end face 22*ab* of roller 22*a*.

Sliding bearing member 23*a* has a through hole passing therethrough from one end to the other end. Shaft 21 is inserted into the through hole of sliding bearing member 23*a*. Sliding bearing member 23*a* externally surrounds shaft 21.

Sliding bearing member 23*a* includes a radial sliding bearing 23*aa* (a first sliding bearing) and a thrust sliding bearing 23*ab* (a second sliding bearing). Radial sliding bearing 23*aa* receives force in the radial direction of shaft 21. Radial sliding bearing 23*aa* has a cylindrical shape. Thrust sliding bearing 23*ab* has an annular shape protruding radially outward from one end of radial sliding bearing 23*aa*. Thrust sliding bearing 23*ab* receives force in the axial direction of shaft 21. Thrust sliding bearing 23*ab* is orthogonal to radial sliding bearing 23*aa*, for example. Thrust sliding bearing 23*ab* forms a flange portion with respect to radial sliding bearing 23*aa*. Radial sliding bearing 23*aa* and thrust sliding bearing 23*ab* are integrally formed.

Radial sliding bearing 23*aa* is disposed between inner circumferential surface 22*aa* of roller 22*a* and outer circumferential surface 21*aa* of shaft 21. Radial sliding bearing 23*aa* supports roller 22*a* to be rotatable relative to outer circumferential surface 21*aa* of shaft 21. Radial sliding bearing 23*aa* supports a load in the radial direction.

Thrust sliding bearing 23*ab* is disposed between end face 21*ba* of intermediate flange 21*b* and end face 22*ab* of roller 22*a*. Thrust sliding bearing 23*ab* supports roller 22*a* to be rotatable relative to end face 21*ba* of intermediate flange 21*b*. Thrust sliding bearing 23*ab* supports a load in the axial direction.

Sliding bearing member 23*b* has a flanged cylindrical shape. Sliding bearing member 23*b* is press-fitted onto inner circumferential surface 22*ba* of roller 22*b*. Thus, sliding bearing member 23*b* is rotatable together with roller 22*a*. Sliding bearing member 23*b* is located between inner circumferential surface 22*ba* of roller 22*b* and outer circumferential surface 21*aa* of shaft 21. Sliding bearing member 23*b* is located also between end face 21*bb* of intermediate flange 21*b* and end face 22*bb* of roller 22*b*.

Sliding bearing member 23*b* has a through hole passing therethrough from one end to the other end. Shaft 21 is inserted into the through hole of sliding bearing member 23*b*. Sliding bearing member 23*b* externally surrounds shaft 21.

Sliding bearing member 23*b* includes a radial sliding bearing 23*ba* (a first sliding bearing) and a thrust sliding bearing 23*bb* (a second sliding bearing). Radial sliding bearing 23*ba* receives force in the radial direction of shaft 21. Radial sliding bearing 23*ba* has a cylindrical shape. Thrust sliding bearing 23*bb* has an annular shape protruding radially outward from one end of radial sliding bearing 23*ba*. Thrust sliding bearing 23*bb* receives force in the axial direction of shaft 21. Thrust sliding bearing 23*bb* is orthogonal to radial sliding bearing 23*ba*, for example. Thrust sliding bearing 23*bb* forms a flange portion with respect to radial sliding bearing 23*ba*. Radial sliding bearing 23*ba* and thrust sliding bearing 23*bb* are integrally formed.

Radial sliding bearing 23*ba* is disposed between inner circumferential surface 22*ba* of roller 22*b* and outer circumferential surface 21*aa* of shaft 21. Radial sliding bearing 23*ba* supports roller 22*b* to be rotatable relative to outer circumferential surface 21*aa* of shaft 21. Radial sliding bearing 23*ba* supports a load in the radial direction.

Thrust sliding bearing 23*bb* is disposed between end face 21*bb* of intermediate flange 21*b* and end face 22*bb* of roller 22*b*. Thrust sliding bearing 23*bb* supports roller 22*b* to be rotatable relative to end face 21*bb* of intermediate flange 21*b*. Thrust sliding bearing 23*bb* supports a load in the axial direction.

Each of supports 27*a* and 27*b* is fixed to outer circumferential surface 21*aa* of shaft body 21*a*. Two rollers 22*a* and 22*b* are sandwiched between supports 27*a* and 27*b*.

Floating seal 26*a* includes rotating-side member 26*a*R and fixed-side member 26*a*F. Rotating-side member 26*a*R is supported by roller 22*a*. Thus, rotating-side member 26*a*R rotates together with roller 22*a*. Rotating-side member 26*a*R is rotatable relative to fixed-side member 26*a*F.

Rotating-side member 26*a*R includes an elastic ring 26*aa* and a metal seal ring 26*ab*. Metal seal ring 26*ab* is supported by inner circumferential surface 22*aa* of roller 22*a* with elastic ring 26*aa* interposed therebetween.

Fixed-side member 26*a*F includes an elastic ring 26*ac* and a metal seal ring 26*ad*. Metal seal ring 26*ad* is supported by support 27*a* with elastic ring 26*ac* interposed therebetween.

Each of elastic rings 26*aa* and 26*ac* is, for example, an O-ring and made of resin or the like. Each of metal seal rings 26*ab* and 26*ad* is made of a metal material.

The elastic force of each of elastic rings 26*aa* and 26*ac* causes metal seal rings 26*ab* and 26*ad* to come into contact with each other to be held in the sealed state. When rotating-side member 26*a*R rotates relative to fixed-side member 26*a*F, metal seal rings 26*ab* and 26*ad* slide relative to each other while being held in the sealed state. Thus, leakage of the lubricating oil can be prevented.

Floating seal 26*b* includes rotating-side member 26*b*R and fixed-side member 26*b*F. Rotating-side member 26*b*R is supported by roller 22*b*. Thus, rotating-side member 26*b*R rotates together with roller 22*b*. Rotating-side member 26*b*R is rotatable relative to fixed-side member 26*b*F.

Rotating-side member 26*b*R includes an elastic ring 26*ba* and a metal seal ring 26*bb*. Metal seal ring 26*bb* is supported by inner circumferential surface 22*ba* of roller 22*b* with elastic ring 26*ba* interposed therebetween.

Fixed-side member 26*b*F includes an elastic ring 26*bc* and a metal seal ring 26*bd*. Metal seal ring 26*bd* is supported by support 27*b* with elastic ring 26*bc* interposed therebetween.

Each of elastic rings 26*ba* and 26*bc* is, for example, an O-ring and made of resin or the like. Each of metal seal rings 26*bb* and 26*bd* is made of a metal material.

The elastic force of each of elastic rings 26*ba* and 26*bc* causes metal seal rings 26*bb* and 26*bd* to come into contact with each other to be held in the sealed state. When rotating-side member 26bR rotates relative to fixed-side member 26bF, metal seal rings 26bb and 26bd slide relative to each other while being held in the sealed state. Thus, leakage of the lubricating oil can be prevented.

As shown in FIG. 4, shaft body 21a includes a flow path 21c, branch flow paths 21da and 21db, and recessed portions 21ea and 21eb. Flow path 21c, branch flow paths 21da and 21db, and recessed portions 21ea and 21eb each are filled with lubricating oil.

The lubricating oil also functions as a cooling medium. The cooling medium may be other than oil and may be grease, for example. The cooling medium may be any medium as long as it can cool floating seals 26a and 26b, radial sliding bearings 23aa and 23ba, and thrust sliding bearings 23ab and 23bb.

Each of recessed portions 21ea and 21eb serves as a portion in which a cooling medium is accommodated. Each of recessed portions 21ea and 21eb is disposed on the outer circumferential surface of shaft 21, particularly on outer circumferential surface 21aa of shaft body 21a. Each of recessed portions 21ea and 21eb is recessed from outer circumferential surface 21aa of shaft body 21a toward the inner circumference in the radial direction.

In the radial direction of shaft 21, recessed portion 21ea faces: the sliding portion between rotating-side member 26aR and fixed-side member 26aF in floating seal 26a; and radial sliding bearing 23aa. In the radial direction of shaft 21, recessed portion 21ea faces: one of rotating-side member 26aR and fixed-side member 26aF in floating seal 26a; and radial sliding bearing 23aa. Recessed portion 21ea faces thrust sliding bearing 23ab in the radial direction of shaft 21.

In the radial direction of shaft 21, recessed portion 21ea faces rotating-side member 26aR and fixed-side member 26aF of floating seal 26a. In the radial direction of shaft 21, recessed portion 21ea also faces a region sandwiched between radial sliding bearing 23aa and floating seal 26a.

Recessed portion 21ea extends in the axial direction from a position radially facing radial sliding bearing 23aa to a position radially facing fixed-side member 26aF of floating seal 26a. Recessed portion 21ea preferably extends in the axial direction from a position radially facing thrust sliding bearing 23ab to a position radially facing fixed-side member 26aF of floating seal 26a.

In the radial direction of shaft 21, recessed portion 21eb faces: the sliding portion between rotating-side member 26bR and fixed-side member 26bF in floating seal 26b; and radial sliding bearing 23ba. In the radial direction of shaft 21, recessed portion 21eb faces: one of rotating-side member 26bR and fixed-side member 26bF in floating seal 26b; and radial sliding bearing 23ba. Recessed portion 21eb faces thrust sliding bearing 23bb in the radial direction of shaft 21.

In the radial direction of shaft 21, recessed portion 21eb faces rotating-side member 26bR and fixed-side member 26bF of floating seal 26b. In the radial direction of shaft 21, recessed portion 21eb also faces a region sandwiched between radial sliding bearing 23ba and floating seal 26b.

Recessed portion 21eb extends in the axial direction from a position radially facing radial sliding bearing 23ba to a position radially facing fixed-side member 26bF of floating seal 26b. Recessed portion 21eb preferably extends in the axial direction from a position radially facing thrust sliding bearing 23bb to a position radially facing fixed-side member 26bF of floating seal 26b.

Recessed portions 21ea are disposed in line symmetry with respect to axis line C. Recessed portions 21eb are disposed in line symmetry with respect to axis line C. Recessed portion 21ea and recessed portion 21eb are disposed in line symmetry with respect to a center line D passing through the center of intermediate flange 21b in the axial direction.

Flow path 21c extends, for example, linearly through shaft body 21a along the axis line of shaft 21. One end of flow path 21c is located closer to one end of shaft 21 than intermediate flange 21b, and also located in a region facing recessed portion 21ea in the radial direction. The other end of flow path 21c reaches the other end of shaft 21 in the radial direction.

Each of branch flow paths 21da and 21db extends, for example, linearly from flow path 21c radially outward of shaft 21. Branch flow path 21da connects flow path 21c and recessed portion 21ea. Branch flow path 21db connects flow path 21c and recessed portion 21eb. Branch flow path 21da is disposed closer to one end of shaft 21 than intermediate flange 21b. Branch flow path 21db is disposed closer to the other end of shaft 21 than intermediate flange 21b.

As shown in FIG. 5, a plurality of recessed portions 21ea are provided on outer circumferential surface 21aa of shaft body 21a. The plurality of recessed portions 21ea are, for example, two recessed portions 21ea separated from each other. However, the plurality of recessed portions 21ea may be three or more recessed portions 21ea separated from each other.

The plurality of recessed portions 21ea may be provided in point symmetry with respect to a point through which axis line C passes in a cross section orthogonal to axis line C. The plurality of recessed portions 21ea may be provided in line symmetry with respect to a straight line E passing through axis line C.

<Construction of Track Roller 20>

In the following, construction of track roller 20 in the present embodiment will be described with reference to FIG. 6.

Figure 6:
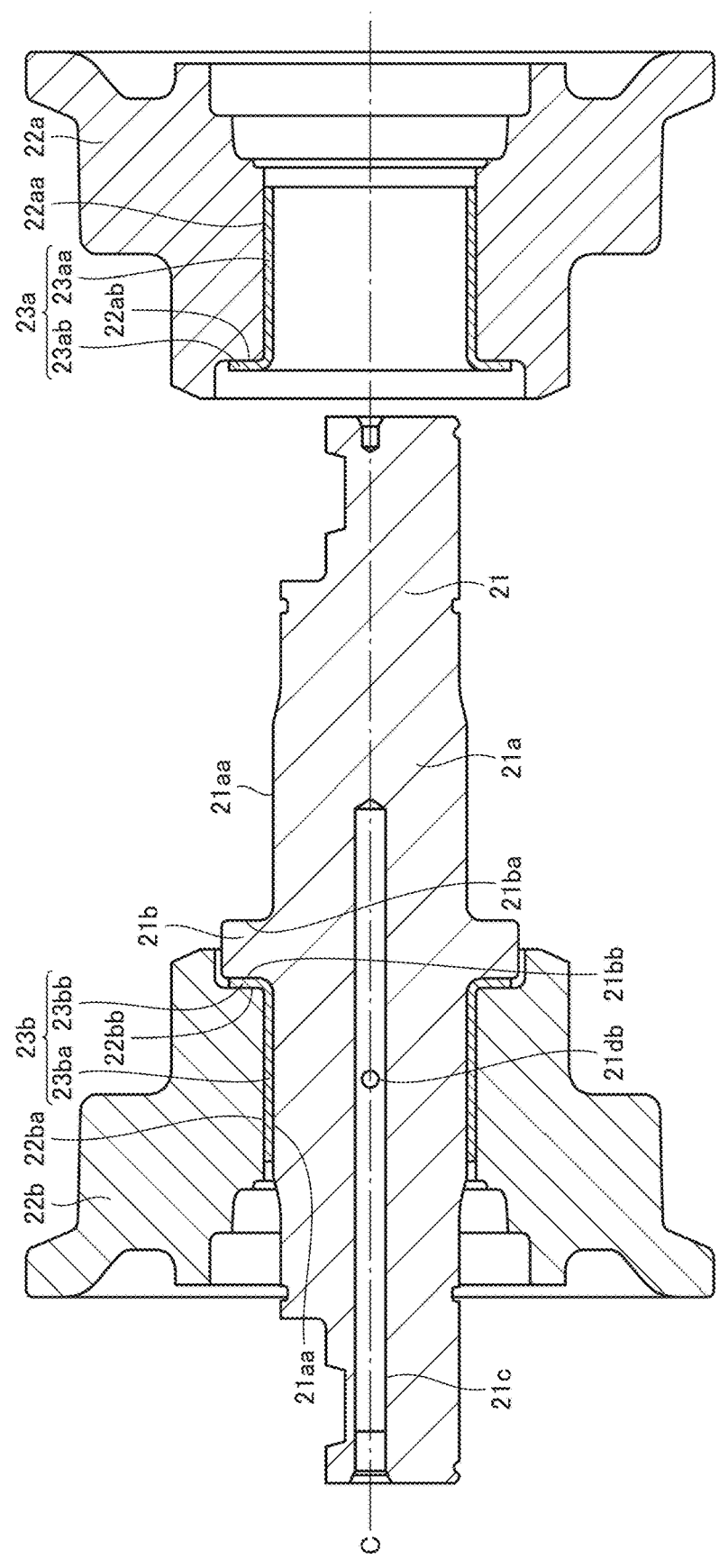
FIG. 6 is a cross-sectional view showing a method of constructing the track roller shown in FIG. 2.

FIG. 6 is a cross-sectional view showing a method of constructing the track roller shown in FIG. 2. As shown in FIG. 6, sliding bearing member 23a is first fixed to inner circumferential surface 22aa of roller 22a by press fitting. Thus, radial sliding bearing 23aa of sliding bearing member 23a comes into contact with inner circumferential surface 22aa of roller 22a. Also, thrust sliding bearing 23ab of sliding bearing member 23a comes into contact with end face 22ab of roller 22a.

Further, sliding bearing member 23b is fixed to inner circumferential surface 22ba of roller 22b by press fitting. Thus, radial sliding bearing 23ba of sliding bearing member 23b comes into contact with inner circumferential surface 22ba of roller 22b. Also, thrust sliding bearing 23bb of sliding bearing member 23b comes into contact with end face 22bb of roller 22b.

Then, shaft 21 is inserted toward the inner circumference of roller 22a and inserted toward the inner circumference of roller 22b. Specifically, shaft 21 is inserted toward the inner circumference of each of sliding bearing members 23a and 23b.

As shown in FIG. 3, one end of roller 22a and one end of roller 22b are welded. Thus, rollers 22a and 22b are joined together by weld 22c. In this state, radial sliding bearing 23aa of sliding bearing member 23a is located between outer circumferential surface 21aa of shaft body 21a and inner circumferential surface 22aa of roller 22a. Also, thrust sliding bearing 23ab of sliding bearing member 23a is located between end face 21ba of intermediate flange 21b and end face 22ab of roller 22a.

Further, radial sliding bearing 23*ba* of sliding bearing member 23*b* is located between outer circumferential surface 21*aa* of shaft body 21*a* and inner circumferential surface 22*ba* of roller 22*b*. Also, thrust sliding bearing 23*bb* of sliding bearing member 23*b* is located between end face 21*bb* of intermediate flange 21*b* and end face 22*bb* of roller 22*b*.

As shown in FIG. 4, in this state, in the radial direction of shaft 21, recessed portion 21*ea* faces: the sliding portion between rotating-side member 26*a*R and fixed-side member 26*a*F in floating seal 26*a*; and radial sliding bearing 23*aa*. Recessed portion 21*ea* faces thrust sliding bearing 23*ab* in the radial direction of shaft 21.

In the radial direction of shaft 21, recessed portion 21*eb* faces: the sliding portion between rotating-side member 26*b*R and fixed-side member 26*b*F in floating seal 26*b*; and radial sliding bearing 23*ba*. Recessed portion 21*eb* faces thrust sliding bearing 23*bb* in the radial direction of shaft 21.

Then, rotating-side member 26*a*R of floating seal 26*a* is attached to the inner circumferential surface of roller 22*a*. Rotating-side member 26*b*R of floating seal 26*b* is attached to the inner circumferential surface of roller 22*b*.

Then, support 27*a* to which fixed-side member 26*a*F of floating seal 26*a* is attached is fixed to shaft 21. Support 27*b* to which fixed-side member 26*b*F of floating seal 26*b* is attached is fixed to shaft 21.

Thus, track roller 20 in the present embodiment is constructed.

<Functions and Effects>

The functions and effects of the present embodiment will then be described.

According to track roller 20 in the present embodiment, as shown in FIG. 4, in the radial direction of shaft 21, recessed portion 21*ea* in which the cooling medium is accommodated faces: the sliding portion between rotating-side member 26*a*R and fixed-side member 26*a*F in floating seal 26*a*; and radial sliding bearing 23*aa*. Thus, the cooling medium in recessed portion 21*ea* can cool both radial sliding bearing 23*aa* and floating seal 26*a*. Thereby, in a simple structure provided with recessed portion 21*ea*, the cooling performance can be improved, and heat generation can be suppressed.

In the radial direction of shaft 21, recessed portion 21*eb* in which the cooling medium is accommodated faces: the sliding portion between rotating-side member 26*b*R and fixed-side member 26*b*F in floating seal 26*b*; and radial sliding bearing 23*ba*. Thus, the cooling medium in recessed portion 21*eb* can cool both radial sliding bearing 23*ba* and floating seal 26*b*. Thereby, in a simple structure provided with recessed portion 21*eb*, the cooling performance can be improved, and heat generation can be suppressed.

Further, according to track roller 20 in the present embodiment, recessed portion 21*ea* faces thrust sliding bearing 23*ab* in the radial direction of shaft 21, as shown in FIG. 4. Thus, the cooling medium in recessed portion 21*ea* can also cool thrust sliding bearing 23*ab*. Thereby, in a simple structure provided with recessed portion 21*ea*, the cooling performance can be further improved and heat generation can be further suppressed.

Further, according to track roller 20 in the present embodiment, recessed portion 21*eb* faces thrust sliding bearing 23*bb* in the radial direction of shaft 21, as shown in FIG. 4. Thus, the cooling medium in recessed portion 21*eb* can also cool thrust sliding bearing 23*bb*. Thereby, in a simple structure provided with recessed portion 21*eb*, the cooling performance can be further improved and heat generation can be further suppressed.

According to track roller 20 in the present embodiment, recessed portions 21*ea* are provided in line symmetry with respect to axis line C of shaft 21, as shown in FIG. 4. This makes it easy to supply the cooling medium uniformly in the circumferential direction of each of radial sliding bearing 23*aa* and floating seal 26*a*.

Recessed portions 21*eb* are provided in line symmetry with respect to axis line C of shaft 21. This makes it easy to supply the cooling medium uniformly in the circumferential direction of each of radial sliding bearing 23*ba* and floating seal 26*b*.

Second Embodiment

<Configuration of Track Roller 20>

In the following, the configuration of track roller 20 in the second embodiment of the present disclosure will be described with reference to FIGS. 7 and 8.

Figure 7:
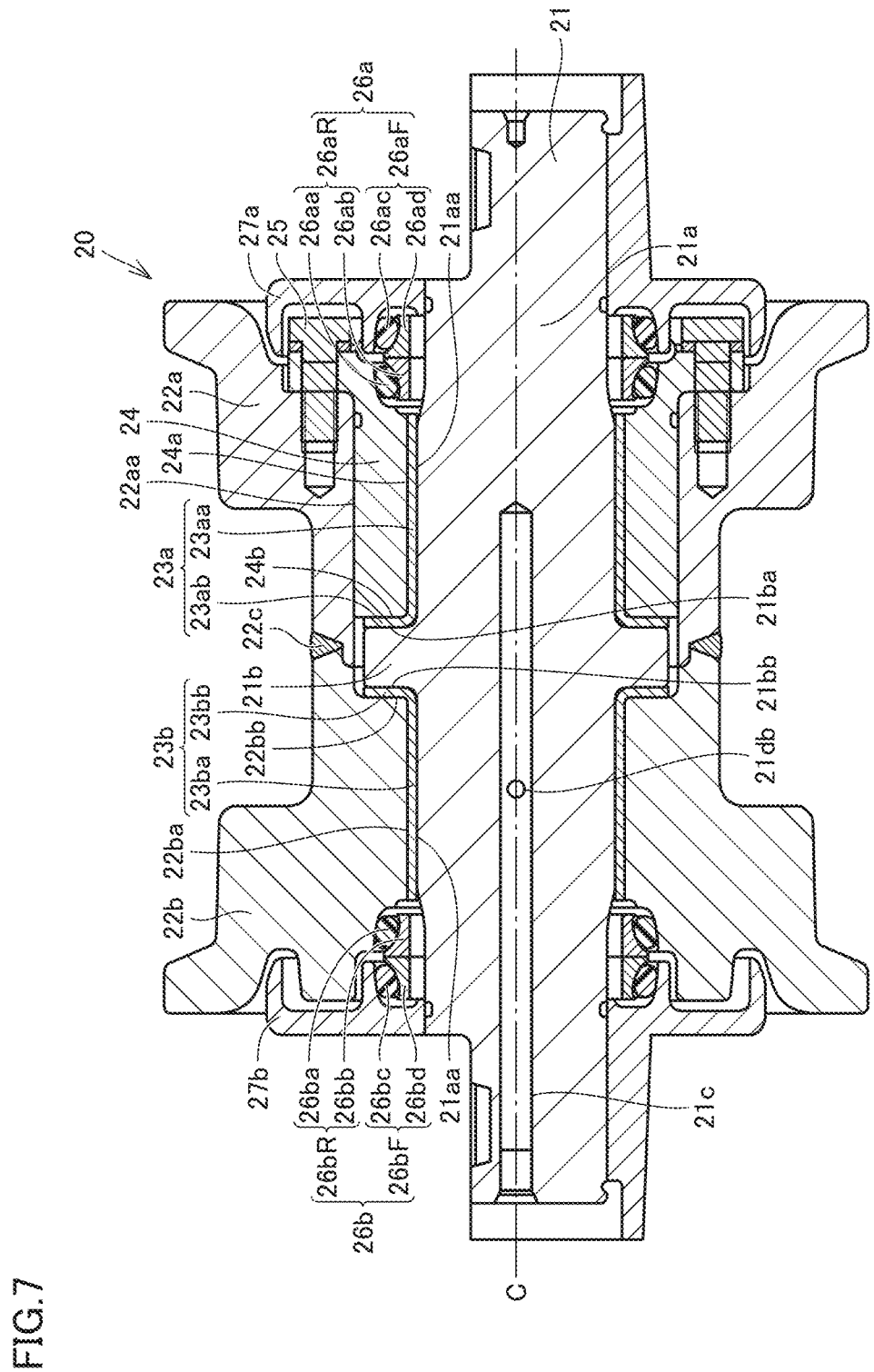
FIG. 7 is a first cross-sectional view showing a configuration of a track roller included in a work machine according to a second embodiment of the present disclosure.
Figure 8:
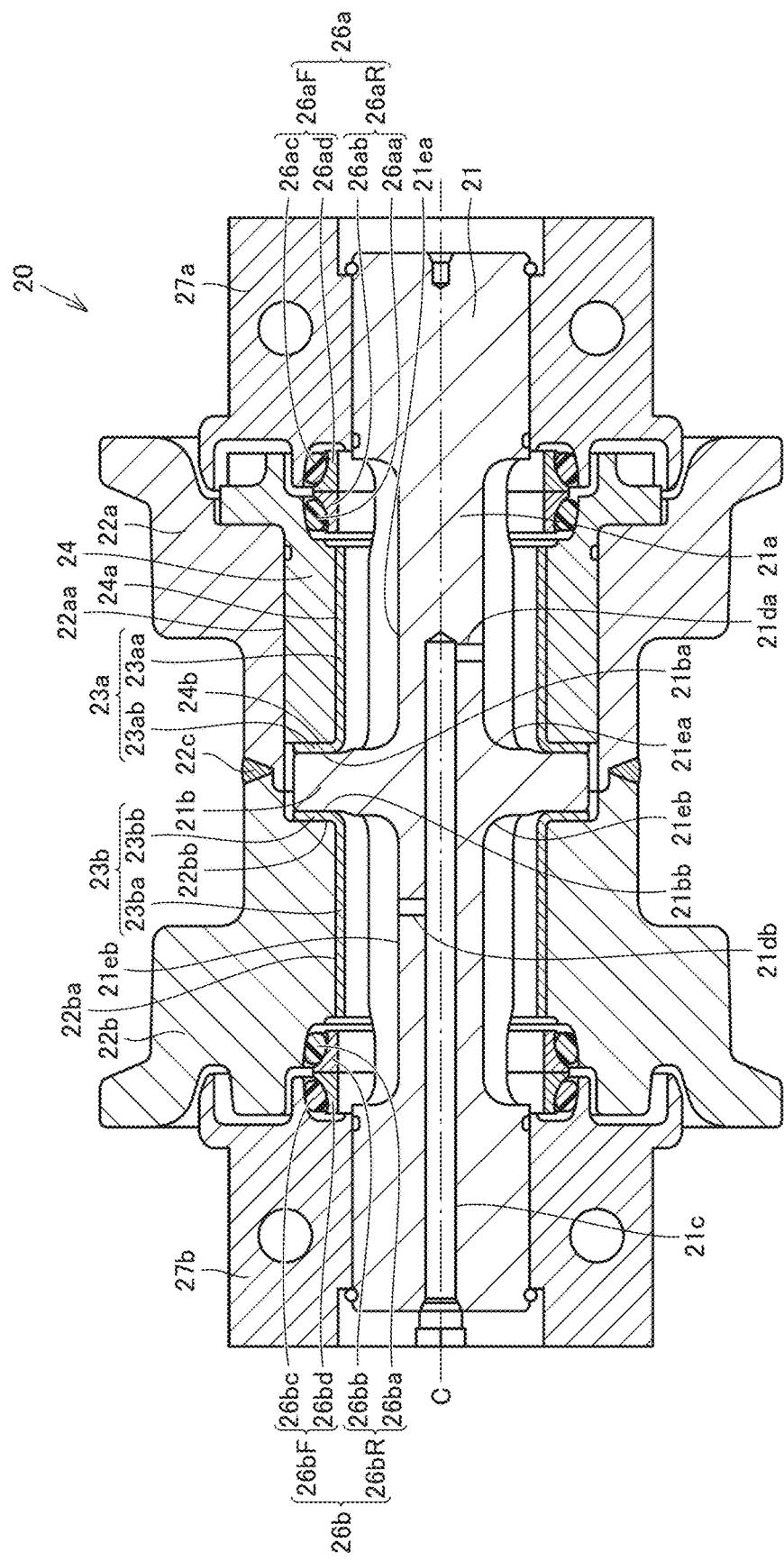
FIG. 8 is a second cross-sectional view showing the configuration of the track roller included in the work machine according to the second embodiment of the present disclosure.

FIGS. 7 and 8 are a first cross-sectional view and a second cross-sectional view, respectively, each of which shows a configuration of a track roller included in a work machine according to the second embodiment of the present disclosure. As shown in FIG. 7, track roller 20 in the present embodiment is different in configuration from track roller 20 in the first embodiment shown in FIGS. 2 to 5 in that a bushing 24 and a fixing member 25 are additionally provided.

Bushing 24 has a flanged cylindrical shape including a cylindrical portion and a flange portion. The flange portion of bushing 24 protrudes radially outward from the cylindrical portion of bushing 24. Bushing 24 is disposed between the outer circumferential surface of shaft 21 (outer circumferential surface 21*aa* of shaft body 21*a*) and inner circumferential surface 22*aa* of roller 22*a*. Specifically, the cylindrical portion of bushing 24 is disposed between the outer circumferential surface of sliding bearing member 23*a* and inner circumferential surface 22*aa* of roller 22*a*.

Bushing 24 is press-fitted onto inner circumferential surface 22*aa* of roller 22*a*. The cylindrical portion of bushing 24 is in contact with the inner circumferential surface of roller 22*a*. The flange portion of bushing 24 is in contact with the end face of roller 22*a*. Bushing 24 is fixed to roller 22*a* by a plurality of fixing members 25. Each of the plurality of fixing members 25 is a bolt, for example. Each of bolts 25 is screwed through the flange portion of bushing 24 into a female thread portion of roller 22*a*. Thus, bushing 24 is configured to rotate together with roller 22*a*.

Sliding bearing member 23*a* is press-fitted onto an inner circumferential surface 24*a* of bushing 24. Thus, sliding bearing member 23*a* is configured to rotate together with roller 22*a* and bushing 24. Radial sliding bearing 23*aa* of sliding bearing member 23*a* is in contact with inner circumferential surface 24*a* of bushing 24. Radial sliding bearing 23*aa* is located between outer circumferential surface 21*aa* of shaft body 21*a* and inner circumferential surface 24*a* of bushing 24.

Further, thrust sliding bearing 23*ab* of sliding bearing member 23*a* is in contact with end face 24*b* of bushing 24. Thrust sliding bearing 23*ab* is located between end face 24*b* of bushing 24 and end face 21*ba* of intermediate flange 21*b*.

Rotating-side member 26*a*R of floating seal 26*a* is supported by roller 22*a* with bushing 24 interposed therebetween. Thus, rotating-side member 26*a*R rotates together with bushing 24 and roller 22*a*. Rotating-side member 26*a*R is configured to be rotatable relative to fixed-side member 26*a*F. Metal seal ring 26*ab* of rotating-side member 26*a*R is supported by inner circumferential surface 24a of bushing 24 with elastic ring 26aa interposed therebetween.

As shown in FIG. 8, in the radial direction of shaft 21, recessed portion 21ea faces rotating-side member 26aR and fixed-side member 26aF of floating seal 26a. Further, in the radial direction of shaft 21, recessed portion 21ea also faces a region sandwiched between radial sliding bearing 23aa and floating seal 26a.

Recessed portion 21ea extends in the axial direction from a position radially facing thrust sliding bearing 23ab to a position radially facing fixed-side member 26aF of floating seal 26a. The dimension of recessed portion 21ea in the axial direction may be smaller or larger than the dimension of bushing 24 in the axial direction.

Since the configuration of the present embodiment other than the above is substantially the same as that of the first embodiment, the same elements are denoted by the same reference characters, and the description thereof will not be repeated.

<Construction of Track Roller 20>

In the following, construction of track roller 20 in the present embodiment will be described with reference to FIGS. 9 and 10.

Figure 9:
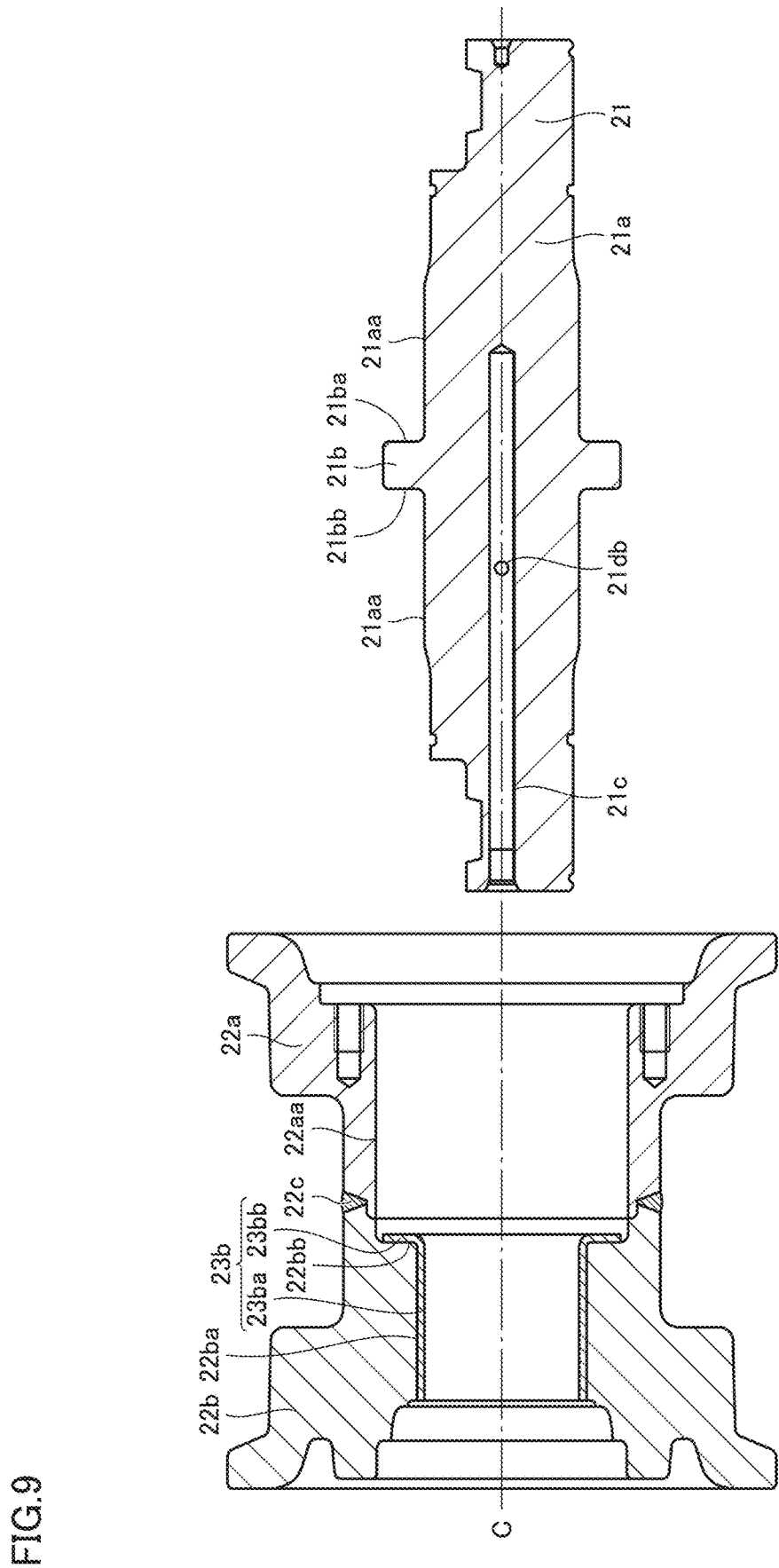
FIG. 9 is a cross-sectional view showing a first step in a method of constructing the track roller shown in FIG. 7.
Figure 10:
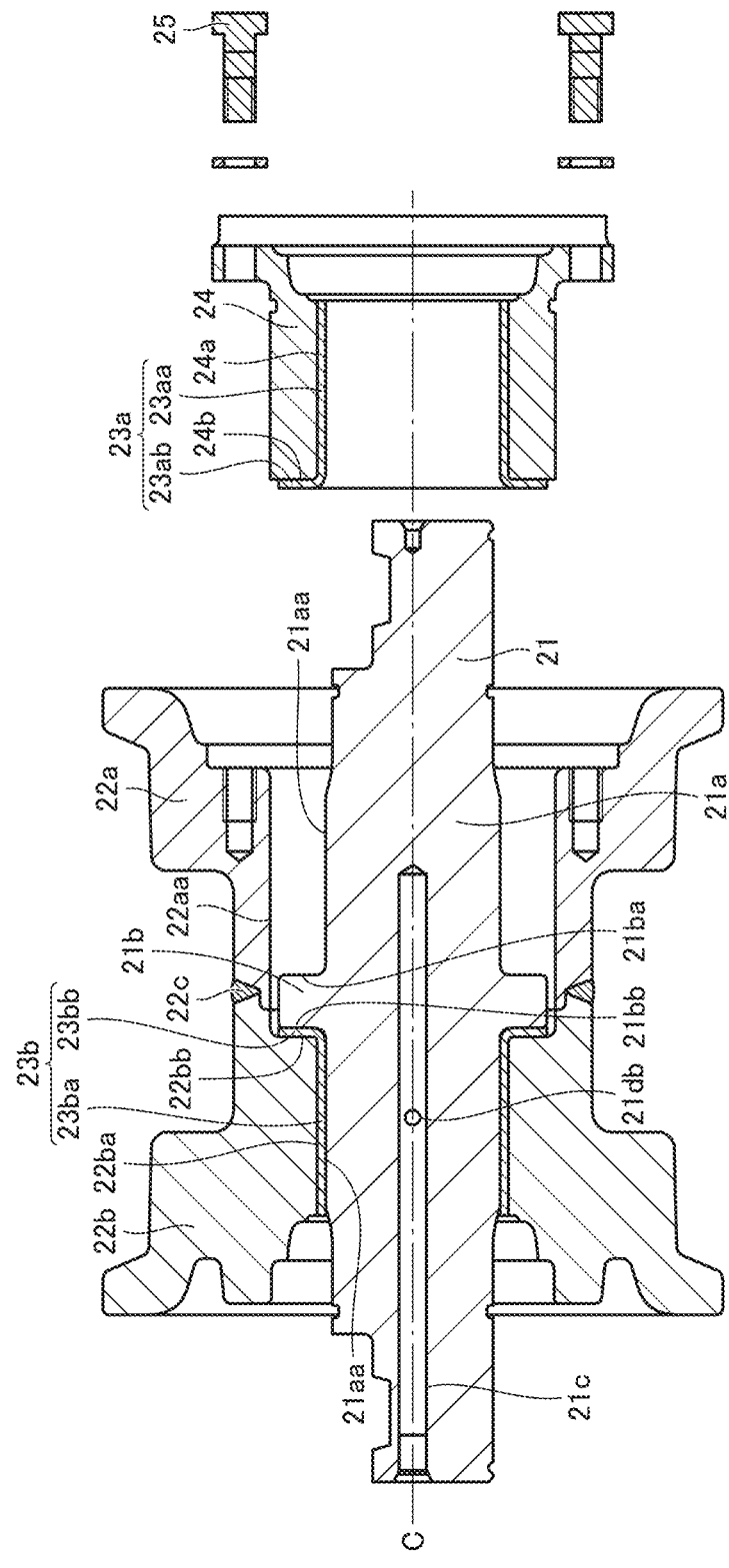
FIG. 10 is a cross-sectional view showing a second step in the method of constructing the track roller shown in FIG. 7.

FIGS. 9 and 10 each are a cross-sectional view showing a method of constructing the track roller shown in FIG. 7 in the order of steps. As shown in FIG. 9, one end of roller 22a and one end of roller 22b are first welded. Thus, rollers 22a and 22b are joined together by a weld 22c. Then, sliding bearing member 23b is fixed to the inner circumference of roller 22b by press fitting. Then, shaft 21 is inserted into rollers 22a and 22b.

As shown in FIG. 10, sliding bearing member 23a is press-fitted onto inner circumferential surface 24a of bushing 24. Bushing 24 into which sliding bearing member 23a is press-fitted is press-fitted onto inner circumferential surface 22aa of roller 22a. Thus, bushing 24 is disposed between outer circumferential surface 21aa of shaft 21 and inner circumferential surface 22aa of roller 22a. Then, bushing 24 is fixed to roller 22a with a fixing member 25 such as a bolt.

In this state, radial sliding bearing 23aa of sliding bearing member 23a and bushing 24 are located between outer circumferential surface 21aa of shaft body 21a and inner circumferential surface 22aa of roller 22a. Also, thrust sliding bearing 23ab of sliding bearing member 23a is located between end face 21ba of intermediate flange 21b and end face 24b of bushing 24.

Further, radial sliding bearing 23ba of sliding bearing member 23b is located between outer circumferential surface 21aa of shaft body 21a and inner circumferential surface 22ba of roller 22b. Also, thrust sliding bearing 23bb of sliding bearing member 23b is located between end face 21bb of intermediate flange 21b and end face 22bb of roller 22b.

As shown in FIG. 8, in this state, in the radial direction of shaft 21, recessed portion 21ea faces: the sliding portion between rotating-side member 26aR and fixed-side member 26aF in floating seal 26a; and radial sliding bearing 23aa. Recessed portion 21ea faces thrust sliding bearing 23ab in the radial direction of shaft 21.

In the radial direction of shaft 21, recessed portion 21eb faces: the sliding portion between rotating-side member 26bR and fixed-side member 26bF in floating seal 26b; and radial sliding bearing 23ba. Recessed portion 21eb faces thrust sliding bearing 23bb in the radial direction of shaft 21.

As shown in FIG. 7, rotating-side member 26aR of floating seal 26a is attached to the inner circumferential surface of roller 22a. Also, rotating-side member 26bR of floating seal 26b is attached to the inner circumferential surface of roller 22b.

Then, support 27a to which fixed-side member 26aF of floating seal 26a is attached is fixed to shaft 21. Support 27b to which fixed-side member 26bF of floating seal 26b is attached is fixed to shaft 21.

Thus, track roller 20 in the present embodiment is constructed.

<Functions and Effects>

According to the present embodiment, as shown in FIG. 8, in the radial direction of shaft 21, recessed portion 21ea in which the cooling medium is accommodated faces: the sliding portion between rotating-side member 26aR and fixed-side member 26aF in floating seal 26a; and radial sliding bearing 23aa. Also, in the radial direction of shaft 21, recessed portion 21eb in which the cooling medium is accommodated faces: the sliding portion between rotating-side member 26bR and fixed-side member 26bF in floating seal 26b; and radial sliding bearing 23ba. Therefore, in a simple structure, the cooling performance can be improved and heat generation can be suppressed, as in the first embodiment.

According to the present embodiment, bushing 24 is disposed between outer circumferential surface 21aa of shaft 21 and inner circumferential surface 22aa of roller 22a. Rotating-side member 26aR of floating seal 26a is supported by roller 22a with bushing 24 interposed therebetween. Since bushing 24 is provided in this way, track roller 20 is constructed more readily than in the first embodiment, which will be described below.

In the case where no bushing is provided as shown in FIG. 6, rollers 22a and 22b are disposed to externally surround shaft 21, and thereafter, rollers 22a and 22b are welded to each other. In this case, the heat during welding may cause thermal strain in rollers 22a and 22b. Such thermal strain may prevent rollers 22a and 22b from rotating relative to shaft 21.

On the other hand, when bushing 24 is provided, bushing 24 is press-fitted into roller 22a as shown in FIG. 10, thereby preventing shaft 21 from falling out of rollers 22a and 22b. Thus, as shown in FIGS. 9 and 10, shaft 21 can be inserted into rollers 22a and 22b after rollers 22a and 22b are welded together. Accordingly, it can be inspected whether thermal strain occurs or not in rollers 22a and 22b after rollers 22a and 22b are welded together and before rollers 22a and 22b are attached to shaft 21. By such an inspection, rollers 22a and 22b in which large thermal strain occurs can be eliminated before construction. This facilitates construction, and also, allows rollers 22a and 22b to be rotatable relative to shaft 21.

Third Embodiment

<Configuration of Track Roller 20>

In the following, the configuration of a track roller 20 in the third embodiment of the present disclosure will be described with reference to FIGS. 11 and 12.

Figure 11:
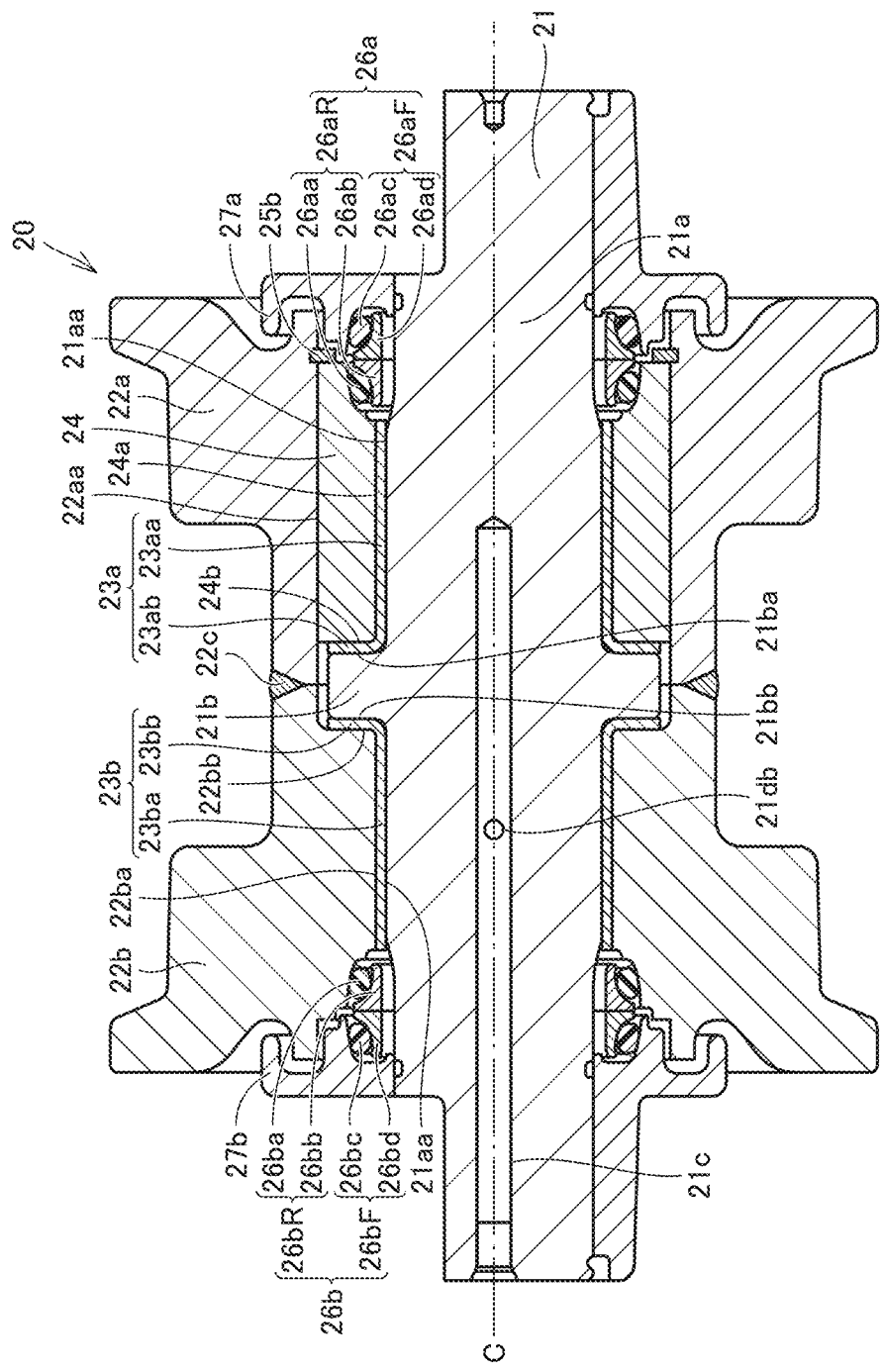
FIG. 11 is a first cross-sectional view showing a configuration of a track roller included in a work machine according to a third embodiment of the present disclosure.
Figure 12:
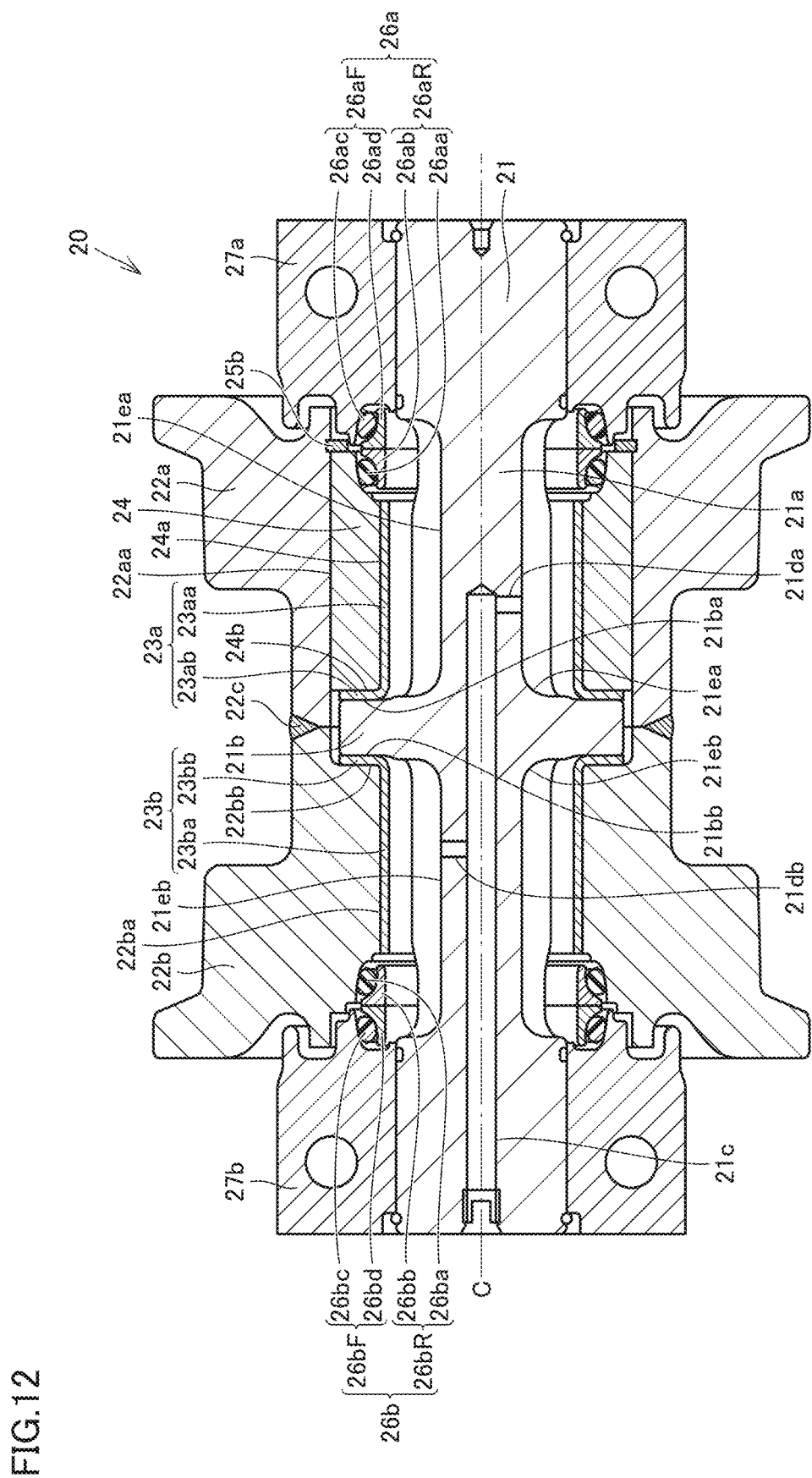
FIG. 12 is a second cross-sectional view showing the configuration of the track roller included in the work machine according to the third embodiment of the present disclosure.

FIGS. 11 and 12 are a first cross-sectional view and a second cross-sectional view, respectively, each of which shows a configuration of a track roller included in a work machine according to the third embodiment of the present disclosure. As shown in FIG. 11, track roller 20 in the present embodiment is different in configuration from track roller 20 in the second embodiment shown in FIGS. 7 and 8 in that a snap ring is used as a fixing member 25b.

A snap ring 25b as fixing member 25b is used in place of fixing member 25 in the second embodiment. Therefore, in the present embodiment, fixing member 25 such as a bolt in the second embodiment is not used.

Snap ring 25b is, for example, a spring ring having an annular shape that is partially notched. Snap ring 25b is fitted into an annular groove provided in inner circumferential surface 22aa of roller 22a. In the state where snap ring 25b is attached to roller 22a, the inner diameter of snap ring 25b is smaller than the outer diameter of bushing 24. The outer diameter of snap ring 25b is larger than the outer diameter of bushing 24. Thus, snap ring 25b prevents bushing 24 from falling out of roller 22a in the axial direction, and fixes bushing 24 to roller 22a.

As shown in FIG. 12, recessed portion 21ea faces both rotating-side member 26aR and fixed-side member 26aF of floating seal 26a in the radial direction of shaft 21. Further, recessed portion 21ea also faces a region sandwiched between radial sliding bearing 23aa and floating seal 26a in the radial direction of shaft 21.

Recessed portion 21ea extends in the axial direction from a position radially facing thrust sliding bearing 23ab to a position radially facing fixed-side member 26aF of floating seal 26a. The dimension of recessed portion 21ea in the axial direction is larger than the dimension of bushing 24 in the axial direction.

Since the configuration of the present embodiment other than the above is substantially the same as that of the second embodiment, the same elements are denoted by the same reference characters, and the description thereof will not be repeated.

For constructing track roller 20 in the present embodiment, bushing 24 is fixed to roller 22a by a snap ring 25b in place of a fixing member such as a bolt. Since the manner of constructing track roller 20 in the present embodiment other than this is substantially the same as that in the second embodiment, the description thereof will not be repeated.

According to the present embodiment, the same effects as those achieved in the first and second embodiments can be achieved.

(Others)

The configuration of the present disclosure is applicable not only to track roller 20 but also to idler wheel 42, carrier roller 20a, and the like. In the following, a configuration obtained by applying the configuration of the present disclosure to idler wheel 42 will be described with reference to FIG. 13.

Figure 13:
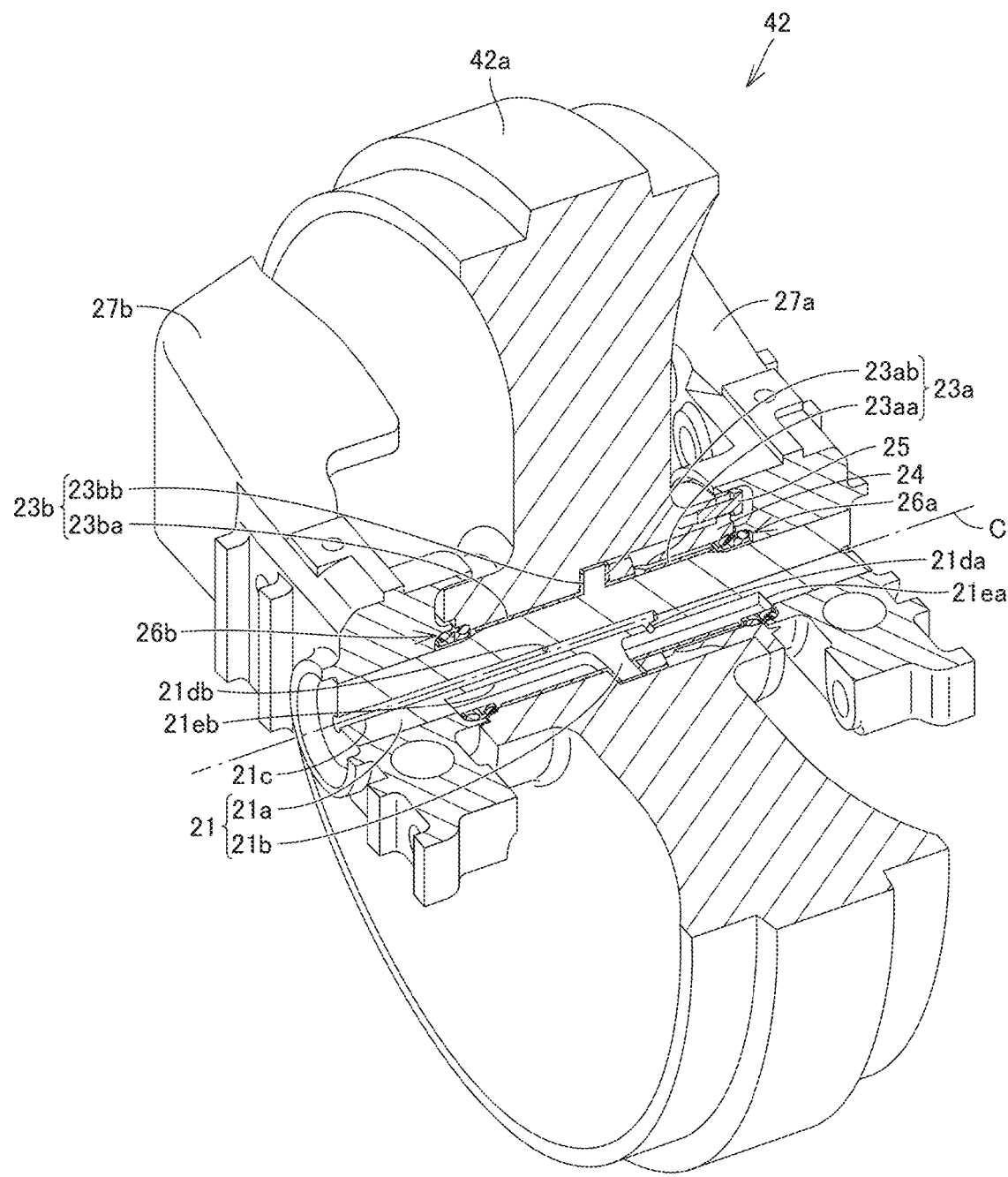
FIG. 13 is a partially cutaway perspective view showing a configuration of an idler wheel included in the work machine in FIG. 1.

FIG. 13 is a partially cutaway perspective view showing a configuration of idler wheel included in work machine 100 in FIG. 1. As shown in FIG. 13, idler wheel 42 in the present embodiment includes a shaft 21, a roller 42a, sliding bearing members 23a and 23b, a bushing 24, a fixing member 25, floating seals 26a and 26b, and supports 27a and 27b.

Idler wheel 42 according to the present embodiment is different in configuration from track roller 20 according to the second embodiment mainly in the configuration of roller 42a. Roller 42a has a through hole into which shaft 21 is inserted. The through hole is configured such that a large diameter portion and a small diameter portion are connected in the axial direction.

In the small diameter portion, radial sliding bearing 23ba of sliding bearing member 23b is disposed between the inner circumferential surface of roller 42a and the outer circumferential surface of shaft body 21a.

In the large diameter portion, radial sliding bearing 23ba of sliding bearing member 23b and bushing 24 are disposed between the inner circumferential surface of roller 42a and the outer circumferential surface of shaft body 21a. Thrust sliding bearing 23bb of sliding bearing member 23b is disposed between the end face of roller 42a and the end face of intermediate flange 21b that provide a difference in height level between the small diameter portion and the large diameter portion. Thrust sliding bearing 23ab of sliding bearing member 23a is disposed between the end face of intermediate flange 21b and the end face of bushing 24.

In the radial direction of shaft 21, recessed portion 21ea faces: the sliding portion between rotating-side member 26aR and fixed-side member 26aF in floating seal 26a; and radial sliding bearing 23aa. Recessed portion 21ea faces thrust sliding bearing 23ab in the radial direction of shaft 21.

In the radial direction of shaft 21, recessed portion 21eb faces: the sliding portion between rotating-side member 26bR and fixed-side member 26bF in floating seal 26b; and radial sliding bearing 23ba. Recessed portion 21eb faces thrust sliding bearing 23bb in the radial direction of shaft 21.

Since the configuration of idler wheel 42 other than the above is substantially the same as the configuration of track roller 20 in the second embodiment, the same elements are denoted by the same reference characters, and the description thereof will not be repeated.

Also in the case where the configuration of the present disclosure is applied to other rollers such as idler wheel 42 and upper roller 20a as described above, the same effect as that achieved in the second embodiment can be achieved.

While the configuration obtained by applying the configuration of the second embodiment to idler wheel 42 has been described above, the configuration of the first or third embodiment may be applied to idler wheel 42. Further, any one of the configurations in the first to third embodiments may be applied to carrier roller 20a.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST 1 crawler travel unit, 1A crawler belt unit, 2 vehicular body, 3 work implement, 4 cab, 5 engine compartment, 6 blade, 6a upper end, 7 frame, 8 angle cylinder, 9 lift cylinder, 10 crawler belt, 20 track roller, 20a carrier roller, 21 shaft, 21a shaft body, 21aa outer circumferential surface, 21b intermediate flange, 21ba, 21bb, 22ab, 22bb, 24b end face, 21c flow path 21da, 21db branch flow path, 21ea, 21eb recessed portion, 22a, 22b, 42a roller, 22aa, 22ba, 24a inner circumferential surface, 22c weld, 23a, 23b sliding bearing member, 23aa, 23ba radial sliding bearing, 23ab, 23bb thrust sliding bearing, 24 bushing, 25, 25b fixing member, 25b snap ring, 26a, 26b floating seal, 26aF, 26bF fixed-side member, 26aR, 26bR rotating-side member, 26aa elastic ring, 26ab, 26ad metal seal ring, 27a, 27b support, 41 drive wheel, 42 idler wheel, 43 track frame, 100 bulldozer.

The invention claimed is:

1. A roller unit of a crawler travel unit, the roller unit comprising:
a shaft having an outer circumferential surface provided with a recessed portion in which a cooling medium is accommodated;
a roller that is rotatable relative to the outer circumferential surface of the shaft;

a first sliding bearing that supports the roller to be rotatable relative to the outer circumferential surface of the shaft, and receives force in a radial direction of the shaft; and a floating seal including a rotating-side member that is supported by the roller and a fixed-side member that slides together with the rotating-side member, wherein in the radial direction of the shaft, the recessed portion faces: a sliding portion between the rotating-side member and the fixed-side member in the floating seal; and the first sliding bearing, the shaft includes an intermediate flange protruding outward in the radial direction, the roller unit further comprises a second sliding bearing that supports the roller to be rotatable relative to the intermediate flange and receives force in an axial direction of the shaft, and the recessed portion faces the second sliding bearing in the radial direction of the shaft.

2. The roller unit of the crawler travel unit according to claim 1, wherein a plurality of the recessed portions are disposed in line symmetry with respect to an axis line of the shaft.

3. The roller unit of the crawler travel unit according to claim 1, further comprising a bushing disposed between the outer circumferential surface of the shaft and an inner circumferential surface of the roller, wherein the rotating-side member is supported by the roller with the bushing interposed therebetween.

4. A roller unit of a crawler travel unit, the roller unit comprising:

a shaft having an outer circumferential surface provided with a recessed portion in which a cooling medium is accommodated;

a roller that is rotatable relative to the outer circumferential surface of the shaft;

a first sliding bearing that supports the roller to be rotatable relative to the outer circumferential surface of the shaft, and receives force in a radial direction of the shaft; and a floating seal including a rotating-side member that is supported by the roller and a fixed-side member that slides together with the rotating-side member, wherein in the radial direction of the shaft, the recessed portion faces: one of the rotating-side member and the fixed-side member in the floating seal; and the first sliding bearing, the shaft includes an intermediate flange protruding outward in the radial direction, the roller unit further comprises a second sliding bearing that supports the roller to be rotatable relative to the intermediate flange and receives force in an axial direction of the shaft, and the recessed portion faces the second sliding bearing in the radial direction of the shaft.

5. A crawler travel unit comprising:

the roller unit according to claim 1; and a crawler belt unit having an annular shape and supported by the roller unit to be rotatable.

6. A work machine comprising:

the crawler travel unit according to claim 5; and a work machine body supported by the crawler travel unit.

* * * * *